US012684064B2

(12) United States Patent
Harnas et al.

(10) Patent No.: US 12,684,064 B2
(45) Date of Patent: Jul. 14, 2026

(54) APPLICATION PROGRAM ENHANCEMENT WITH CALLER IDENTIFICATION FUNCTIONALITY

(71) Applicant: Sync.me, Ramat Gan (IL)

(72) Inventors: Vadim Harnas, Haifa (IL); Chen Vinner, Kibbutz HaOgen (IL)

(73) Assignee: Sync.me, Ramat Gan (IL)

( * ) Notice: Subject to any disclaimer, the term of this patent is extended or adjusted under 35 U.S.C. 154(b) by 297 days.

(21) Appl. No.: 18/641,375

(22) Filed: Apr. 21, 2024

(65) Prior Publication Data

US 2025/0330538 A1 Oct. 23, 2025

(51) Int. Cl.
H04M 3/436 (2006.01)
H04M 1/72484 (2021.01)

(52) U.S. Cl.
CPC ....... H04M 3/436 (2013.01); H04M 1/72484 (2021.01)

(58) Field of Classification Search
CPC .... H04M 15/72; H04M 15/58; H04M 3/2218; H04M 15/00; H04M 15/8083; H04M 3/42153; H04M 3/5175; H04M 15/47; H04M 3/42306; H04M 3/42357; H04M 15/80; H04M 15/8214; H04M 3/42161; H04M 15/08; H04M 15/755

USPC ........................................................ 455/415
See application file for complete search history.

(56) References Cited

U.S. PATENT DOCUMENTS

| | | | | |
|---|---|---|---|---|
| 2016/0173683 A1* | 6/2016 | Abreu | ................... | H04L 51/224 |
| | | | | 455/414.1 |
| 2018/0074580 A1* | 3/2018 | Hardee | ................ | G03H 1/0005 |
| 2021/0344794 A1* | 11/2021 | Kats | .................... | H04M 1/2757 |

* cited by examiner

*Primary Examiner* — Ajibola A Akinyemi

(57) ABSTRACT

A method, apparatus, and computer program product for providing an application program with caller identification functionality. At least one notification object corresponding to at least one notification message graphical user interface element presented externally to a graphical user interface of the application program and intercepted by a listener service registered for the application program may be obtained. For a respective one of the at least one notification object, content of at least one field of the respective notification object may be analyzed according to at least one field pattern, call information comprising at least a telephone number extracted from the content analyzed may be obtained, and a profile corresponding to the telephone number may be retrieved from a database. In response to an incoming call from the telephone number, a user of the application program may be presented with identification information from the profile.

20 Claims, 4 Drawing Sheets

APPLICATION PROGRAM ENHANCEMENT WITH CALLER IDENTIFICATION FUNCTIONALITY

FIELD AND BACKGROUND OF THE INVENTION

Some embodiments described in the present disclosure relate to digital network telecommunications and, more specifically, but not exclusively, to application program enhancement with caller identification functionality.

The advent of high throughput data communication networks and ever-growing ubiquity of computing devices spurred rapid evolution of both the consumer electronics and digital products and services industries alike during recent years. One prominent trend is an ongoing rise in extent and variability of widespread use among vast populations at multiple countries around the globe of mobile devices equipped with general purpose processing capabilities, such as smartphones (i.e., mobile telephones running a full-fledged operating system platform), tablet computers, laptop computers, wearable computers (e.g., smartwatches), and/or likewise portable computing devices, which are provided with the ability to communicate with other devices and/or device types over a variety of wired and/or wireless communication protocols.

The afore-said technological and cultural developments are being reciprocated in turn by the emergence and proliferation of a huge variety of software products and services intended specifically for usage on, integration by, interaction with, utilization of, and/or likewise related purposes in connection to such mobile devices. One prevalent example of commercially available software for mobile devices and/or similar computing platforms are application programs, also commonly referred to as "apps" in short, which are often offered to users via online distribution services, known as application marketplaces or app stores. For example, for mobile devices using Android™ mobile operating system, developed by a consortium dominated by Google™, the digital distribution service Google Play™ serves as the official app store and allows users to browse and download applications developed with the Android software development kit (SDK) and published through Google.

SUMMARY OF THE INVENTION

It is an object of the present disclosure to describe a system and a method for application program enhancement with caller identification functionality.

The foregoing and other objects are achieved by the features of the independent claims. Further implementation forms are apparent from the dependent claims, the description and the figures.

According to one aspect of some embodiments of the disclosed subject matter there is provided a method for providing an application program with caller identification functionality, comprising:

providing program instructions which, when executed by at least one processor, cause the at least one processor performing:

obtaining at least one notification object corresponding to at least one notification message graphical user interface element presented externally to a graphical user interface of the application program and intercepted by a listener service registered for the application program;

for a respective one of the at least one notification object:

analyzing content of at least one field of the respective notification object according to at least one field pattern;

obtaining call information comprising at least a telephone number extracted from the content analyzed;

retrieving a profile corresponding to the telephone number from a database; and in response to an incoming call from the telephone number, presenting a user of the application program with identification information from the profile.

Optionally, the method further comprises providing program instructions for prompting the user to approve notifications access by the application program, subsequent to registering the listener service.

Optionally, the obtaining of call information further comprises determining a call state of a telephone call associated with the respective notification object using a call state manager broadcast receiver registered for the application program.

More optionally, the method further comprises providing program instructions for prompting the user to approve access to read phone state by the application program, subsequent to registering the call state manager broadcast receiver.

More optionally, determining the call state further comprises checking for the respective notification object a value of a field indicative of the telephone call taking place.

More optionally, the value denotes a predicate of a chronometer display.

Optionally, the at least one field pattern comprising a first pattern for an address book contact and a second pattern for a non-address book contact.

Optionally, analyzing the content of the at least one field further comprises determining whether the respective notification object corresponds to a notification shown by a dialer application program, by using a package name and a respective package field of the respective notification object.

Optionally, the program instructions are provided via a software development kit.

Optionally, retrieving the profile comprises sending the telephone number to a backend server.

According to another aspect of some embodiments of the disclosed subject matter there is provided an apparatus for providing an application program with caller identification functionality, comprising:

a processing circuitry adapted for:

obtaining at least one notification object corresponding to at least one notification message graphical user interface element presented externally to a graphical user interface of the application program and intercepted by a listener service registered for the application program;

for a respective one of the at least one notification object:

analyzing content of at least one field of the respective notification object according to at least one field pattern;

obtaining call information comprising at least a telephone number extracted from the content analyzed;

retrieving a profile corresponding to the telephone number from a database; and in response to an incoming call from the telephone number, presenting a user of the application program with identification information from the profile.

Optionally, the processing circuitry is further adapted for prompting the user to approve notifications access by the application program, subsequent to registering the listener service.

Optionally, the obtaining of call information further comprises determining a call state of a telephone call associated with the respective notification object using a call state manager broadcast receiver registered for the application program.

More optionally, the processing circuitry is further adapted for prompting the user to approve access to read phone state by the application program, subsequent to registering the call state manager broadcast receiver.

More optionally, determining the call state further comprises checking for the respective notification object a value of a field indicative of the telephone call taking place.

More optionally, the value denotes a predicate of a chronometer display.

Optionally, the at least one field pattern comprising a first pattern for an address book contact and a second pattern for a non-address book contact.

Optionally, analyzing the content of the at least one field further comprises determining whether the respective notification object corresponds to a notification shown by a dialer application program, by using a package name and a respective package field of the respective notification object.

Optionally, retrieving the profile comprises sending the telephone number to a backend server.

According to yet another aspect of some embodiments of the disclosed subject matter there is provided a computer program product comprising:

a non-transitory computer readable storage medium;

program instructions for executing, by a processor, a method for providing an application program with caller identification functionality, comprising:

program instructions for obtaining at least one notification object corresponding to at least one notification message graphical user interface element presented externally to a graphical user interface of the application program and intercepted by a listener service registered for the application program;

program instructions for performing, for a respective one of the at least one notification object:

analyzing content of at least one field of the respective notification object according to at least one field pattern;

obtaining call information comprising at least a telephone number extracted from the content analyzed;

retrieving a profile corresponding to the telephone number from a database; and in response to an incoming call from the telephone number, presenting a user of the application program with identification information from the profile.

Optionally, the computer program product further comprises program instructions for prompting the user to approve notifications access by the application program, subsequent to registering the listener service.

Optionally, the obtaining of call information further comprises determining a call state of a telephone call associated with the respective notification object using a call state manager broadcast receiver registered for the application program.

More optionally, the computer program product further comprises program instructions for prompting the user to approve access to read phone state by the application program, subsequent to registering the call state manager broadcast receiver.

More optionally, determining the call state further comprising checking for the respective notification object a value of a field indicative of the telephone call taking place.

More optionally, the value denotes a predicate of a chronometer display.

Optionally, the at least one field pattern comprising a first pattern for an address book contact and a second pattern for a non-address book contact.

Optionally, analyzing the content of the at least one field further comprising determining whether the respective notification object corresponds to a notification shown by a dialer application program, by using a package name and a respective package field of the respective notification object.

Optionally, the program instructions are provided via a software development kit.

Optionally, retrieving the profile comprises sending the telephone number to a backend server.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DESCRIPTION OF SPECIFIC EMBODIMENTS OF THE DISCLOSURE

Figure 1:
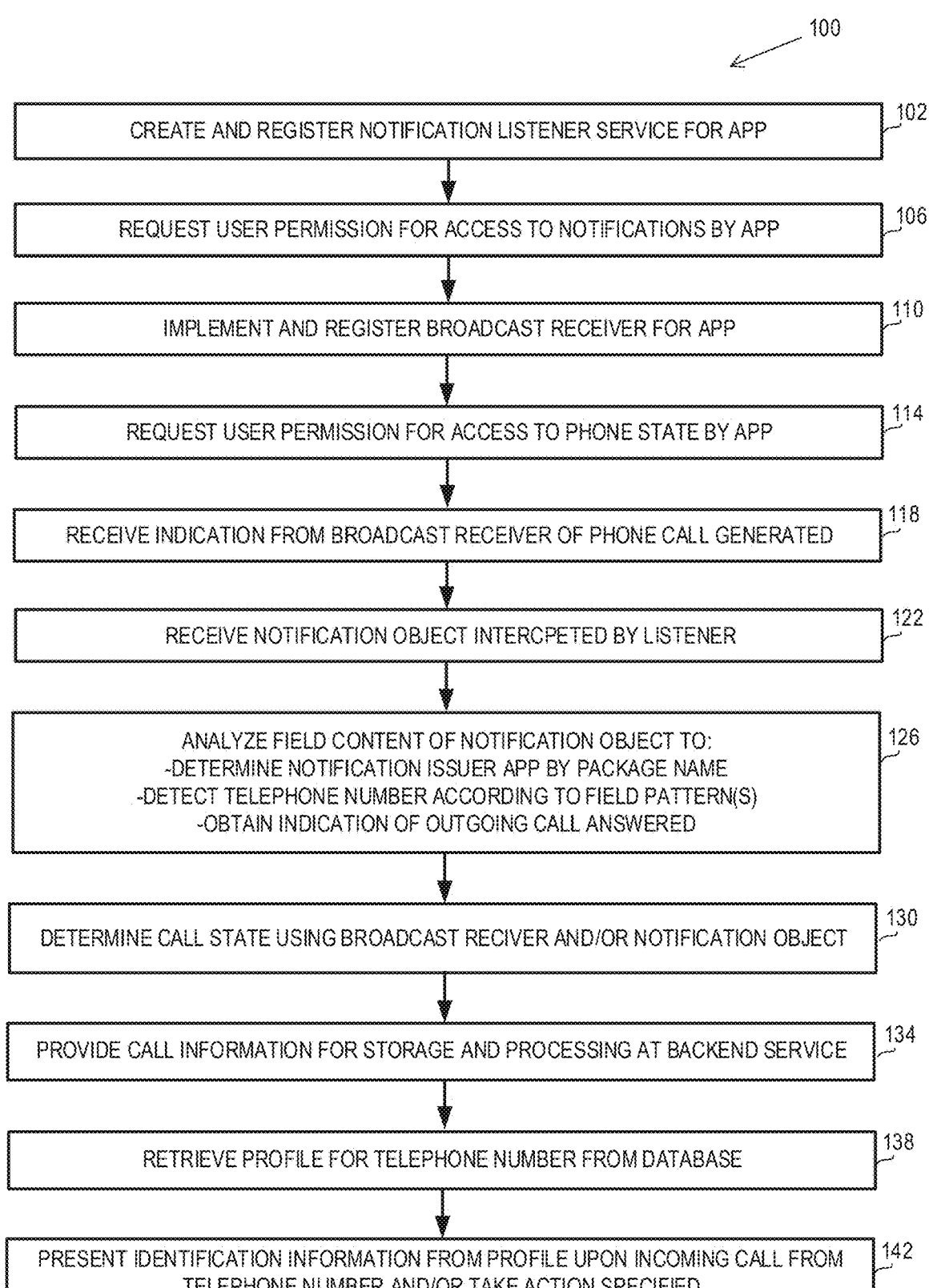
FIG. 1 is a flowchart schematically representing an optional flow of operations for application program enhancement with caller identification functionality, according to some embodiments.

Some embodiments described in the present disclosure relate to digital network telecommunications and, more specifically, but not exclusively, to application program enhancement with caller identification functionality.

Caller identification, also referred to as caller ID in short, is a telephone service, available either in analog and/or digital phone systems and on most voice over Internet Protocol (VOIP) applications, that transmits a caller's number to the called party's telephone equipment during the ringing signal, or when the call is being set up but before the call is answered. Where available, caller ID can also provide other and/or additional caller identification information, such as a name, image, ringtone, and/or the like, associated with the calling telephone number. The information made available to the called party may be presented to the user on their device, e.g., displayed on screen, played through speakers, etc., and the user may decide accordingly whether to accept or reject the call. Additionally or alternatively, the caller identification information may be further processed and used for automatically blocking unwanted calls and/or unknown callers, e.g., by spam detection and blocking tools, and/or the like.

One pre-existing approach for providing caller ID functionality by an application program is to designate the application program as a default caller ID app. Such approach requires a developer of the app to take measures and see to that both a set of preconditions is fulfilled and a flow of operations is carried out by the app in order to enable caller ID functionality.

For example, in case of an Android app to be distributed via an official application marketplace, e.g., Google Play store, those preconditions include:

(i) adding a caller ID text to the title of the app for presentation at the Google Play store;

(ii) adding screenshots that show the caller ID functionality of the app for display in the Google Play store;

(iii) providing the Caller ID as core functionally of the app and not as only a feature.

It will be appreciated that when the app is submitted to the application marketplace, it is reviewed for potential violations and/or non-compliance with the terms and conditions of use, such that apps that try to add caller ID functionality only as a feature and not as core functionality would get rejected. It therefore follows that the aforesaid approach is not relevant for a vast majority of apps, such as for example, games, photo galleries, utilities, navigation, and/or the like.

Further, in such case of an Android app to be distributed on Google Play store, the flow of operations includes:

(i) creating a class that extends the class of:
android.telecom.CallScreeningService;

(ii) registering the class in the Android manifest file ("AndroidManifest.xml") with:

android:permission =

"android.permission.BIND_SCREENING_SERVICE";

(iii) requesting the user to select the app as the default caller ID app, e.g., using the following exemplary code:

```
RoleManager roleManager =
(RoleManager) getSystemService(ROLE_SERVICE);
Intent intent =
roleManager.createRequestRoleIntent(RoleManager.ROLE_CALL
_SCREENING);
startActivityForResult(intent, REQUEST_ID);
```

It will be appreciated that if the user rejects the request, the app may not be able to obtain a telephone number whenever a call may be generated. If the user accepts the request, the app may be able to locate a telephone number in:

CallScreeningClass::onScreenCall(callDetails:Call.Details), where the telephone number that may be used for caller identification services may be found in:

callDetails.handle.schemeSpecificPart.

Another pre-existing approach for providing caller ID functionality by an application program is to request for sensitive permissions. Here, too, similarly as with the former pre-existing approach, there are both preconditions to fulfill and operations flow required.

For example, for an Android app on the Google play store, the preconditions include filling and submitting to Google a particular form to be granted with the ability to use these permissions. It will be appreciated that as these permissions are considered as highly privileged, in case that the app for which the permissions are requested is not a caller ID app by definition, namely caller ID services not being its main functionality, the request will be declined by Google.

The operations flow required in this case includes:

(i) adding the two following permissions to the Android manifest file:

android.permission.READ_CALL_LOG; and
android.permission.PROCESS_OUTGOING_CALLS.

(ii) implementing a broadcast receiver that extends the BroadcastReceiver class and used as call state manager.

(iii) registering the broadcast receiver in the android manifest with the intent filter:

android.intent.action.PHONE_STATE.

(iv) requesting the user to approve the aforesaid two permissions.

It will be appreciated that if the user approves these two permissions, then whenever a call may be generated, a respective telephone number for the call may be available in the broadcast receiver, at:

onReceive(context:Context, intent:Intent), where the phone number that may be used for caller identification may be available at:

intent.getStringExtra(Intent.EXTRA_PHONE_NUMBER).

If the user does not approve android.permission.PROCESS_OUTGOING_CALLS, then the app may not be able to know when an outgoing call may be generated.

If both permissions are declined by the user, then no option to obtain a phone number for caller identification by the requesting app may exist.

On some occasions, it may be desired to ascertain not only a telephone number of a generated call, but also a state of that call, e.g., ringing, unanswered, rejected, line busy, and/or the like. Such call state information may be utilized for further processing and analysis in support of caller ID functionality, e.g., for data quality control and improvement purposes, and/or the like.

One pre-existing standard approach for determining a phone call state is by implementing an Android Broadcast Receiver that has intent-filter as follows:

```
<intent-filter>
<action
    android:name="android.intent.action.PHONE_STATE"
    android:priority="999" />
</intent-filter>
```

In addition, there is required user permission for access to the phone state, namely, "android.permission.READ_PHONE_STATE".

However, the default Android Broadcast Receiver has a limitation at least in the sense that it does not provide any callback that an outgoing call was answered.

The disclosed subject matter improves upon and overcomes shortcomings of pre-existing approaches for providing an application program with caller identification functionality.

According to some embodiments, for purposes of implementing caller ID service and/or functionality within an application program, instead of relying on call log-specific and/or sensitive permissions, there may be used a more generic permission type, by which the application program may be afforded access to notifications presented to a user of a mobile device, e.g., system notifications presented by Android on a status bar in a graphical user interface (GUI). Such access may be obtained using for example a permission as follows:

"android.permission.BIND_NOTIFICATION_LISTEN-ER_SERVICE".

It will be appreciated that such permission does not require submission for any Google review as opposed to sensitive permissions and also does not require the caller ID functionality to be core functionality of the app.

In the context of the present disclosure, the term "notification" relates to a message that an operating system plat-form for computerized devices, such as Android and/or the like, on which an application program may be executed, presents to a user outside of a user interface of the application program, to provide the user with information such as for example, reminders, communication from other users, other timely information from another app, and/or the like.

For example, on Android, notifications may automatically appear to users in different locations and formats, e.g., a notification may appear as an icon in the status bar, a more detailed entry in the notification drawer, a badge on an app's icon, and/or the like. Notifications may also appear on paired wearables, on the lock screen in more recent Android versions, and/or the like.

When an app issues a notification, it first appears as an icon in the status bar. Users can swipe down on the status bar to open the notification drawer, where they can view more details and take actions with the notification. The design of a notification is determined by system templates, and the issuer app defines the contents for each portion of the template.

In some embodiments, in order to provide an application program with caller ID functionality, there may be taken prior steps of: (i) registering for the application program a listener service adapted to intercept system bar notifications, and (ii) obtaining user permission for the application program to access notifications.

For example, on Android apps, the listener may be created as an Android service that extends "android.service.notifi-cations.NotificationListenerService", and may be registered in the AndroidManifest.xml file with:

android:permission="android.permission.BIND_ NOTI-FICATION_LISTENER_SERVICE", and with an intent-filter with action as follows:

android:name="android.service.notification.Notification ListenerService".

To vit, registration of a listener service for system bar notifications in an app may be performed using the exemplary code as follows:

```
<service
    android:name=".SystemNotificationsService"
    android:exported="false"
    android:permission=
    "android.permission.BIND_NOTIFICATION_LISTENER_SERVICE">
    <intent-filter>
        <action
        android:name=
    "android.service.notification.NotificationListenerService" />
    </intent-filter>
</service>
```

In order to gain notifications access by the app, there may be a need to obtain user permission, if not already granted. A check whether the user had granted permission may be performed using the exemplary function call as follows:

NotificationManagerCompat.getEnabledListenerPackages(context).contains(context.packageName)

In case that permission had not already been granted, the user may be asked to approve the notification access, e.g., via generating and enabling an intent for the listener, for example, by transferring the user to a device settings screen of apps notifications, using the exemplary code as follows:

```
fun getIntentForNotificationAccess(packageName: String,
notificationAccessServiceClassName: String): Intent {
  if (VERSION.SDK_INT >= VERSION_CODES.R) {
    return
Intent(Settings.ACTION_NOTIFICATION_LISTENER_DETAIL_SETTINGS)
.putExtra(Settings.EXTRA_NOTIFICATION_LISTENER_COMPONENT_NAME,
ComponentName(packageName,
notificationAccessServiceClassName).flattenToString( ))
  }
  val intent =
Intent(Settings.ACTION_NOTIFICATION_LISTENER_SETTINGS)
  val value =
"$packageName/$notificationAccessServiceClassName"
  val key = ":settings:fragment_args_key"
  intent.putExtra(key, value)
  intent.putExtra(":settings:show_fragment_args",
Bundle( ).also { it.putString(key, value) })
  return intent
}
```

It will be appreciated that after the user approves the notifications access, the app has access to read any and all notifications from the status bar of the device.

Accordingly, any notification that may be shown by the device may be also intercepted by the app's notification listener service registered, and the listener may pass a respective notification object for processing by the app, for example, using a function such as "onNotificationPosted" and/or the like, as in the following exemplary call:

NotificationListenerService::onNotificationPosted(sbn: StatusBarNotification).

It will further be appreciated that the app may thus be afforded with a full access to the notification fields.

In some embodiments, a notification object received at the app from the listener may be analyzed, e.g., field contents may be read, extracted, and/or otherwise obtained, such as for example, to determine caller identification and/or other call-related information that may be necessary for providing caller ID functionality.

In some embodiments, analysis of content of fields of the notifications object may be performed according to one or more field patterns. For example, the field pattern(s) may include one pattern for obtaining a telephone number of an address book contact, namely a caller that its phone number and other details are recorded in a database of a contacts manager app on the device, and another pattern for obtaining a telephone number of a non-address book contact.

For example, on Android, in case of a non-address book contact, the phone number may be located in the field named "android.title" as demonstrated in the following exemplary sample of a status bar notification object for non-address book contact:

```
com.google.android.dialer :: sbn {
id=1
post time=1706788773473
tag=null
key=0|com.google.android.dialer|1|null|10141
group=0|com.google.android.dialer|1|null|10141
override group=null
package=com.google.android.dialer
notification=notification {
  category=call
  group=null
  sort=null
  number=0
  when=0
  flags=0x6A [FLAG_FOREGROUND_SERVICE | FLAG_NO_CLEAR |
FLAG_ONGOING_EVENT | FLAG_ONLY_ALERT_ONCE]
  priority=PRIORITY HIGH
  extras=bundle {
    android.title=+380 63 411 8349
    android.reduced.images=true
    android.showChronometer=false
    android.people.list=iterable [
      android.app.Person@15126b0
```

-continued

```
    ]
    android.text= Поточний виклик
    android.appInfo=ApplicationInfo{392a04
    com.google.android.dialer}
    android.largeIcon=Icon(typ=BITMAP size=168x168)
    android.colorized=true
  }
  is group summary=false
  visibility=VISIBILITY_PRIVATE
  sound=null
  ticker=null
  content intent=pending intent {
    creator package=null
    creator uid=−1
    sender=IntentSender{63c4bed:android.os.BinderProxy@17ae617
    }
    isActivity=true
    intent=null
  }
  delete intent=null
  fullscreen intent=null
  content view=null
  big content view=null
  heads up content view=null
  actions=array {Action[ ]} [
  ]
}
```

As another example, on Android, in case of an address book contact, the phone number may be located in the field named "uri" as demonstrated in the following exemplary sample of a status bar notification object for address book contact:

```
onNotificationPosted com.google.android.dialer :: sbn {
id=1
post time=1706788893796
tag=null
key=0|com.google.android.dialer|1|null|10141
group=0|com.google.android.dialer|1|null|10141
override group=null
package=com.google.android.dialer
notification=notification {
  category=call
  group=null
  sort=null
  number=0
  when=0
  flags=0x6A [FLAG_FOREGROUND_SERVICE | FLAG_NO_CLEAR |
FLAG_ONGOING_EVENT | FLAG_ONLY_ALERT_ONCE]
  priority=PRIORITY_HIGH
  extras=bundle {
    android.title=Anna
    android.reduced.images=true
    android.template=android.app.Notification$CallStyle
    android.showChronometer=false
    android.people.list=iterable [
person {
  name=Anna
  key=null
uri=content://com.android.contacts/contacts/lookup/3004r2651-
2A44442A.3134i53b1db38e35dfc7.3134i3650157b88c7efb8.625i5223dd
6489aa50d5.577i3234.1450iSkype_4014.3789r5774-
2A44442A/5876?directory=0
  isBot=false
  isImportant=false
  icon=null
}
person {
  name=Anna
  key=null
  uri=tel:%2B380634473617
  isBot=false
  isImportant=false
  icon=null
```

-continued

```
        }
    ]
    android.text= Набір номера
    android.appInfo=ApplicationInfo{70b9143com.google.android.dial
er}
    android.callIsVideo=false
    android.hangUpIntent=pending intent {
            creator package=null
            creator uid=−1
            sender=IntentSender{30173c0:
android.os.BinderProxy@57ff030}
            isActivity=false
            intent=null
        }
        android.callType=2
        android.largeIcon=Icon(typ=BITMAP size=168x168)
        android.callPerson=android.app.Person@b5013d73
        android.colorized=true
    }
    is group summary=false
    visibility=VISIBILITY_PRIVATE
    sound=null
    ticker=null
    content intent=pending intent {
        creator package=null
        creator uid=−1
        sender=IntentSender{f62f8f9:
android.os.BinderProxy@d3dc4f6}
        isActivity=true
        intent=null
    }
    delete intent=null
    fullscreen intent=null
    content view=null
    big content view=null
    heads up content view=null
    actions=array {Action[ ]} [
        action v4 {
            title=Динамік
            extras=bundle {
                priority=20
            }
            remotes=null
            intent=pending intent {
                creator package=null
                creator uid=−1
                sender=IntentSender{e96103e:
android.os.BinderProxy@b021e2}
                isActivity=false
                intent=null
            }
        }
    }
        action v4 {
            title=Ігнорувати
            extras=bundle {
                priority=22
            }
            remotes=null
            intent=pending intent {
                creator package=null
                creator uid=−1
                sender=IntentSender{ccbfe9f:android.os.BinderProxy@c1d
            7973}
                isActivity=false
                intent=null
            }
        }
        action v4 {
            title= Завершити
            extras=bundle {
                key_action_priority=true
            }
            remotes=null
            intent=pending intent {
                creator package=null
                creator uid=−1
                sender=IntentSender{86a0bec:
android.os.BinderProxy@57ff030}
                isActivity=false
```

-continued

```
    intent=null
      }
    }
   }
  ]
}
```

As can be further seen on the exemplary samples of status bar notification objects for address book and/or non-address book contacts herein, an indication that a notification is a call notification may be provided by the field value: notification.category=="call". Optionally this information may be utilized to facilitate determination of phone states, as discussed further herein.

It will be appreciated that, since notifications' behavior and/or content may vary among different devices and dialer apps, a configuration for field contents and/or field patterns of notification object(s) passed to and/or analyzed by the app may be adjusted to handle various exception cases and/or the like.

In some embodiments, upon receipt of a notification object at the app, a determination may be made whether it corresponds to a notification issued by a dialer app, namely, an application program for conducting telephone calls on a mobile device. Such determination may be made, for example, using package name as may be specified in a respective field of a notification object, e.g., as can be seen on the exemplary notification objects for non-address book contact and/or address book contact, the field "package" contains the value "com.google.android.dialer". Additionally or alternatively, a phone number field in the notification object may be searched for, e.g. using phone number field pattern(s) such as discussed herein.

In some embodiments, a call state manager broadcast receiver (referred to herein also as "broadcast receiver" in short) may also be utilized in support of providing an application program with caller ID functionality. For example, by creating and registering a broadcast receiver for the application program and obtaining user permission for access by that broadcast receiver to a phone state, e.g., using the permission of "android.permission.READ_PHON-E_STATE", the application program may be able to identify that a phone call has been generated, accepted, rejected, unanswered, and/or the like.

A broadcast receiver for an application program may be provided, e.g., on Android, by implementing a BroadCastReceiver object instance that extends the BroadCastReceiver class. The broadcast receiver thus implemented may be registered in the Android manifest with the intent filter "android.intent.action.PHONE_STATE". In order to provide the broadcast receiver with access to phone states, user permission may be requested for "android.permission.READ_PHONE_STATE".

If user permission had been granted, then when a phone call is generated, the broadcast receiver registered for the app may notify the app accordingly about the generated phone call.

In some embodiments, call information obtained from a broadcast receiver may be supplemented using field content obtained from a notification object as received at the app from the listener service. For example, for an outgoing phone call, a determination may be made that the call had been answered, by reading a value of a field indicative of the phone call taking place, such as for example, the field value of "android.showChronometer" that may be changed to TRUE when the outgoing call is answered. This change occurs due to the fact that the notification may show a counter (i.e., call duration), which thus may serve as an indication that the call had been answered.

Optionally, any and/or all phone states may be determined by parsing contents of notifications alone, and without reliance on user permission to access phone state, such as "android.permission.READ_PHONE_STATE" and/or the like. This may be done, for example, by performing one or more of the following exemplary procedures inside the function:

NotificationListenerService::onNotificationPosted(sbn:
        StatusBarNotification).

First, as a preliminary step, a check may be performed to determine whether the notification object represents a call notification, by checking for a field value of: sbn.notification.category=="call". If so, the procedure may continue to process the notification object and analyze its field contents to determine a phone state of the call, otherwise the procedure may terminate.

Second, a field value of the notification object indicating a call type may be analyzed to determine whether the call is incoming or outgoing. For example, if sbn.notification.extras.getInt("android.callType")==2, then the call is outgoing, whereas if sbn.notification.extras.getInt("android.callType")==0, then the call is incoming.

Third, once the type of call had been determined, i.e., whether it is incoming or outgoing, a determination may be made as to whether the call has been answered or not.

For example, to recognize that an outgoing call has been answered, the field value denoting the type of the last notification (i.e., type 2 in case of an outgoing call) may be recorded in storage, and may be later retrieved in response to a subsequent call of the function "onNotificationPosted", which may be made after and as result of the call having been answered. For the notification object returned on the subsequent function call, a check may be made first as to whether the type of the notification matches the previous one stored (i.e., type 2). Then, a check may be performed as to whether a chronometer has been presented with relation to the call, e.g., by checking for the field: sbn.notification.extras.get(Notification.EXTRA_SHOW_CHRONOMETER) !=null, in which case it would mean that the call has been answered. Otherwise, in case that the field is absent, a conclusion that the call has been answered may be drawn from the fact that the "onNotificationPosted" method was called again (i.e., the device triggers the second update in case the notification changes, and the notification changes only if the outgoing call is answered).

Similarly, to recognize that an incoming call has been answered, the field value denoting the type of the last notification (i.e., type 0 in case of an incoming call) may be recorded in storage, and may be later retrieved in response to a subsequent call of the function "onNotificationPosted", which may be made after and as result of the call having been answered. For the notification object returned on the subsequent function call, a check may be made first as to whether the type of the notification matches the previous one stored (i.e., type 0). Then, a check may be performed as to whether a chronometer has been presented with relation to the call, e.g., by checking for the field: sbn.notification.extras.get(Notification.EXTRASHOWCHRONOMETER)!=null, in which case it would mean that the call has been answered. Otherwise, in case that the field is absent, a conclusion that the call has been answered may be drawn from the fact that the "onNotificationPosted" method was called again (i.e., the device triggers the second update in case the notification changes, and the notification changes only if the outgoing call is answered).

In some embodiments, a phone state listener, such as a broadcast receiver and/or the like, having user permission to access phone states, as described herein, may be utilized in combination with a notification listener, in order to streamline notifications processing and conserving resources such as power supply, storage, and/or the like. For example, to make such processing more efficient, only upon receiving indication from the broadcast receiver on a phone call generated, a notification object passed from the notification listener may proceed to be analyzed. In this way, only relevant notifications, rather than any and/or all notifications presented by the device, may undergo analysis for extracting caller information and/or further related data, e.g., phone number, phone state, and/or other likewise call information.

Optionally, identification of a phone state of a call by using a phone state listener may be performed as described herein.

First, inside the Broadcast receiver, registration may be performed using the exemplary code as follows:

```
<receiver
android:name="ai.sync.calls.callinterceptor.PhoneBroadcastReceiver"
    android:exported="false">
    <intent-filter>
        <action
            android:name="android.intent.action.PHONE_STATE"
            android:priority="999" />
    </intent-filter>
    <intent-filter>
        <action
    android:name="android.intent.action.NEW_OUTGOING_CALL" />
    </intent-filter>
</receiver>
```

Second, there may be implemented a function for handling call indications received from the phone state listener using the exemplary code as follows:

```
override fun onReceive(context: Context, intent: Intent)
when (action) {
    ACTION_ON_SCREEN_CALL -> {
        logv("ACTION_ON_SCREEN_CALL")
        if (currentState == State.IDLE) {
            val callDirection =
    intent.getSerializableExtra(EXTRA_ON_SCREEN_CALL_DIRECTION)
                ?: PhoneCallDirection.UNKNOWN
            currentState = when (callDirection) {
                PhoneCallDirection.INCOMING ->
    State.INCOMING_CALL
                else -> State.OUTGOING_CALL
            }
        }
    }
    Intent.ACTION_NEW_OUTGOING_CALL -> {
        if (currentState == State.IDLE) {
            currentState = State.OUTGOING_CALL
        }
    }
    TelephonyManager.ACTION_PHONE_STATE_CHANGED -> {
        val state =
    intent.getStringExtra(TelephonyManager.EXTRA_STATE) ?: return
        when (state) {
            TelephonyManager.EXTRA_STATE_RINGING -> {
                if (currentState == State.IDLE) {
                    currentState = State.INCOMING_CALL
                }
                detectedPhoneNumber = getDetectedPhone(intent)
            }
            TelephonyManager.EXTRA_STATE_IDLE -> {
                currentState = State.IDLE
            }
    TelephonyManager.EXTRA_STATE_OFFHOOK -> {
                if (currentState == State.INCOMING_CALL)
            }
        }
    }
}
```

One technical effect of utilizing the disclosed subject matter is to provide an application program with caller ID functionality without asking users for sensitive permissions and/or undergoing prior reviews by an online app store operator (e.g., Google), and without forcing users to set the app as the default Caller ID app on their devices.

Another technical effect of utilizing the disclosed subject matter is to provide for a manner of determining whether an outgoing call had been answered, in addition to any and all standard Caller ID app behavior that can be achieved by pre-existing approaches.

The disclosed subject matter provides for enhancement of application programs by caller ID functionality using a combination of phone state listener and notifications listener, while overcoming limitations and shortcomings of pre-existing approaches, such as detailed herein.

Other technical problems, solutions, and/or effects of the disclosed subject matter improved upon over pre-existing tools and/or techniques may be apparent from the detailed description herein.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a flowchart schematically representing an optional flow of operations 100 for application program enhancement with caller identification functionality, according to some embodiments.

At 102, for an application program to be enhanced with caller identification functionality, there may be created and registered a notification listener service for intercepting notifications presented to a user of a mobile device. In some embodiments, the notification listener service may be an Android service that extends the android.service.notifications.NotificationListenerService class, and adapted to intercept inter alia system notifications presented on Android operated devices outside of a user interface of the application program, e.g, on a designated location on screen, such as a status bar, a banner, a lock screen display, and/or the like. The notification listener service may be registered in the Andorid manifest file with the permission:

android:permission="android.permission.BIND_ NOTIFICATION_LISTENER_SERVICE"

and with an intent-filter with action:

android:name="android.service.notification.Notification ListenerService".

At 106, user permission for accessing notifications by the application program may be requested. A check may be made whether user permission had been granted already, for example using the function call:

NotificationManagerCompat.getEnabledListenerPackages(context).contains(context.packageName).

Otherwise, if permission for the app to access notifications had not already been granted by a user, the user may be requested to grant it, for example, by transferring the user to a device setting screen for the app for enabling an intent as may be generated using the following exemplary code:

```
if (VERSION.SDK_INT >= VERSION_CODES.R) {
    return
    Intent(Settings.ACTION_NOTIFICATION_LISTENER_DETAIL_SETTINGS)
    .putExtra(Settings.EXTRA_NOTIFICATION_LISTENER_COMPONENT_NAME,
    ComponentName(packageName,
    notificationAccessServiceClassName).flattenToString( ))
}
val intent = Intent(Settings.ACTION_NOTIFICATION_LISTENER_SETTINGS)
val value = "$packageName/$notificationAccessServiceClassName"
val key = ":settings:fragment_args_key"
intent.putExtra(key, value)
intent.putExtra(":settings:show_fragment_args", Bundle( ).also {
it.putString(key, value) })
return intent
```

Once the user approves the permission of:

android.permission.BIND_NOTIFICATION_LISTEN-
ER_SERVICE, then the app may have access to every notification presented on the Android status bar.

At 110, a broadcast receiver may be implemented and registered for the app. The broadcast receiver may be implemented as a BroadCastReceiver object extending the BroadCastReceiver class of Android's application programming interface. The broadcast receiver may be registered in the Android manifest with the intent filter android.intent.action.PHONE_STATE.

At 114, user permission for access to phone state by the broadcast receiver implemented for the app may be requested.

At 118, in response to a phone call being generated, an indication of the phone call generated may be received at the app via the broadcast receiver registered at 110.

At 122, further in response to the phone call generated, a notification by a dialer app may be presented on the mobile device's user interface, e.g. on the Android status bar, such that the notification may be intercepted by the listener registered at 102, and a notification object may be passed to the app for processing, e.g., using the function call:

NotificationListenerService::onNotificationPosted(sbn:
StatusBarNotification).

At 126, the notification object may be analyzed and checked for field contents in order to determine whether the notification issuer app is a dialer app, detect a telephone number, obtain other information related to the phone call generated, and/or the like. The determination whether the notification is presented by a dialer app may be performed using package name and/or by locating the telephone number in a respective field. The detection of a phone number may be performed according to one or more field patterns. For example, in case of a notification related to a phone call generated using an address book contact, then the field that may contain the phone number may be the "uri" field. As another example, in case of a notification related to a phone call generated with a phone number that is not in the address book, then the phone number value may be in the "title" field. Other information related to the phone call generated that may be obtained from the notification object may be, for example, a value of the field "android.showChronometer", which may be changed to TRUE when an outgoing call being answered, thus providing a mechanism to determine that the outgoing call had been answered (as opposed to the default broadcast receiver in the android manifest with the intent filter android.intent.action.PHONE_STATE which does not provide any callback in such case).

At 130, a state of the phone call may be determined according to an indication from the broadcast receiver, e.g., whether an incoming call had been accepted, rejected, unanswered, etc., and/or whether an outgoing call was unanswered, rejected, line busy, and so forth. Optionally, the state of the phone call may be determined using information obtained from the notification object, for example, in case of an outgoing call, a determination may be made whether the call had been answered using data indicating that the call had taken place, such as the field value of "android.showChronometer" and/or the like, as analyzed at 126.

At 134, the telephone number and optionally other call information obtained at 126 and/or 130 may be provided to a caller identification backend service for storage and/or further processing.

At 138, a caller profile for the telephone number detected at 126 may be retrieved from a caller identification database, which may reside at the backend service and/or locally on the mobile device.

At 142, upon receipt of an incoming call from the telephone number detected at 126, identification information from the caller profile retrieved at 138 may be obtained and presented to the user on the mobile device. Additionally or alternatively, an action as specified beforehand for the particular caller and/or call type may be taken, for example, the call may be determined as unwanted by the user and automatically rejected, e.g., identified by spam blocking function as telemarketing call, and/or the like.

Figure 2:
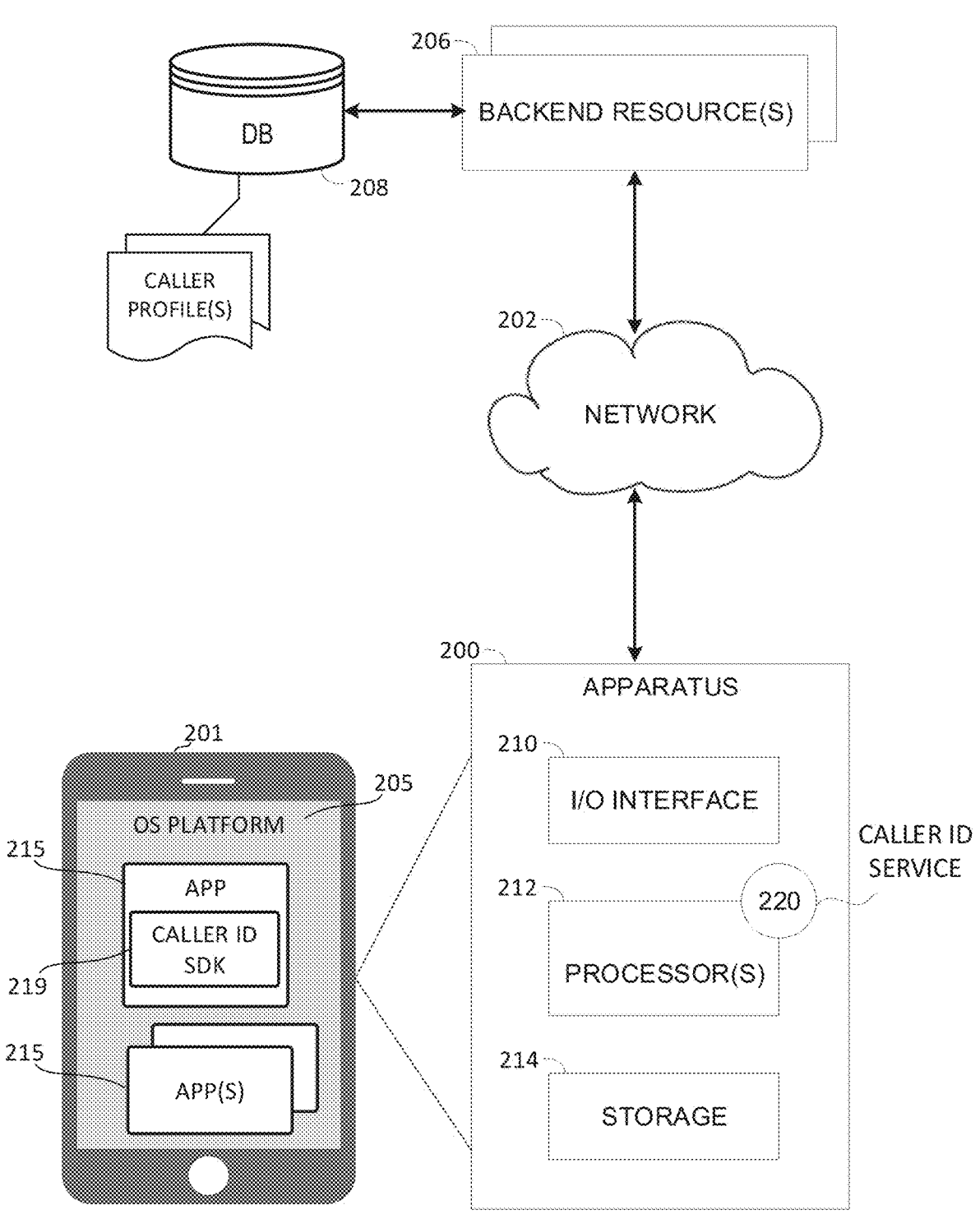
FIG. 2 is a block diagram of an exemplary apparatus for application program enhancement with caller identification functionality, according to some embodiments.

Reference is now made to FIG. 2 which is a block diagram of an exemplary apparatus for application program enhancement with caller identification functionality, according to some embodiments. An exemplary apparatus 200 may be used for performing one or more of the acts and/or operations for providing an application program with caller ID functionality, such as described with reference to FIG. 1 herein.

The apparatus 200 may comprise and/or be implemented as, for example, a computer, a server, a computing node, a cluster of computing nodes and/or the like, which may include an Input/Output (I/O) interface 210 for connecting to one or more external devices, systems, services and/or the like, one or more processor(s) 212 for executing a process such as the optional flow of operations 100 as illustrated in FIG. 1, a storage 214 for storing data and/or code (program store), and/or the like.

In some embodiments, the apparatus 200 may be a mobile device 201 such as for example, a smartphone and/or likewise telecommunications computerized device, and may be provided with an operating system (OS) platform 205 such as Android and/or the like, which may be adapted for running one or more application programs (apps) 215, concurrently and/or interchangeably. Optionally, a respective one of the app(s) 215 may comprise a caller identification software development kit (SDK) 219 for providing the app 215 with caller ID functionality. Additionally or alternatively, an app 215 may be enhanced with caller ID functionality by other means, e.g., by implementing directly one or more of the acts and/or operations for providing an application program with caller ID functionality, such as described with reference to FIG. 1 herein.

The I/O interface 210 may include one or more wired and/or wireless network interfaces for connecting to a network 202 comprising one or more wired and/or wireless networks, for example, a Local Area Network (LAN), a Wide Area Network (WAN), a Metropolitan Area Network (MAN), a cellular network, the internet and/or the like. Using the network interface(s) the optimization system 200 may communicate, optionally via the network 202, with one or more (optionally remote, e.g., networked) backend resource(s) 206, which may optionally comprise and/or be implemented as, for example, a server, a computing node, a storage server, a networked database, a cloud service and/or the like.

The I/O interface 210 may further include one or more wired and/or wireless I/O interfaces, ports, interconnections and/or the like for connecting to one or more external devices, for example, a Universal Serial Bus (USB) interface, a serial interface, a Radio Frequency (RF) interface, a Bluetooth interface and/or the like. Through the I/O interface 210, the apparatus 200 may communicate with one or more external devices (not shown) attached to the I/O interface(s), for example, an attachable mass storage device, an external media device and/or the like.

In some embodiments, the apparatus 200 may comprise, and/or communicate with, via the network 202 for example, a database (DB) on a persistent storage device such as 208, which may store caller profile(s) associated with detected telephone number(s) and/or other call-related information, for providing caller ID services by enhanced app(s) 215 as described herein.

The apparatus 200, communicating with one or more of the backend resource(s) 206 and/or other likewise external devices (not shown), may therefore receive, fetch, collect and/or otherwise obtain data and information required for providing caller ID functionality, e.g., specifically by an app 215 and/or via caller ID SDK 219. Such data and information may include, for example, a caller profile associated with a telephone number retrieved from the DB 208, and/or the like. Optionally the apparatus 200 may communicate with one or more of the external devices and/or use the I/O interface 210 to output data and information to a user pertaining to caller identification information, such as for example, a name, an image, a personalized ringtone, information on previous calls (e.g., phone status), and/or the like.

The processor(s) 212, homogenous or heterogeneous, may include one or more processing nodes arranged for parallel processing, as clusters and/or as one or more multi core processor(s). The storage 214 may include one or more tangible, non-transitory persistent storage devices, for example, a hard drive, a Flash array and/or the like. The storage 214 may also include one or more volatile devices, for example, a Random Access Memory (RAM) component, a cache and/or the like. The storage 214 may further comprise one or more local and/or remote network storage resources, for example, a storage server, a Network Attached Storage (NAS), a network drive, a cloud storage service and/or the like accessible via the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may further include, utilize and/or otherwise facilitate one or more hardware modules (elements), for example, a circuit, a component, an integrated circuit (IC), an Application Specific Integrated Circuit (ASIC), a Field Programmable Gate Array (FPGA), a Digital Signals Processor (DSP), a Graphic Processing Units (GPU), an Artificial Intelligence (AI) accelerator and/or the like.

The processor(s) 212 may therefore execute one or more functional modules utilized by one or more software modules, one or more of the hardware modules and/or a combination thereof. For example, the processor(s) 212 may execute a caller ID service functional module 220 for providing an application with caller ID functionality, in accordance with some embodiments.

Optionally, the apparatus 200, specifically the caller ID service 220 may be supported and/or utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2) and/or the like.

The apparatus 200 may execute one or more applications, services and/or tools such as OS platform 205 and/or app(s) 215 to enable one or more of the users to operate and/or interact with the apparatus 200 and more specifically with the caller ID service 220. For example, the apparatus 200 may present a User Interface (UI), specifically a Graphical UI (GUI) which may be used by the respective users to interact with the caller ID service 220.

In another example, the I/O interface 210 of the apparatus 200 may comprise, be coupled to, communicate with, and/or otherwise be connected to one or more input and/or output (I/O) devices (not shown) for receiving input from and/or providing output to a user. Exemplary such I/O device(s) may comprise one or more of: a touchscreen, a display, a keyboard, a mouse, a touchpad, a microphone, a speaker, a camera, and/or the like. Additionally or alternatively, one or more standalone devices communicating with processor(s) 212, e.g., via the network 202, may serve as I/O device(s), such as for example, a mobile and/or stationary computing device such as a smartphone, a tablet computer, a desktop computer, and/or the like, running a suitable application program, may establish communication (e.g., cellular, network, short range wireless) with the processor(s) 212 using a communication interface (e.g., network interface, cellular interface, short range wireless network interface). The user may input data and/or receive data outputted by the respective device, e.g., by entering and/or viewing data on a display of a smartphone and/or likewise mobile device such as 201, optionally via a graphical user interface (GUI) such as may be presented by the OS platform 205 and/or an application program such as the app(s) 215, and/or the like. The I/O device(s), whether integrated within the apparatus 200 or otherwise attached thereto, may be used by the respective users to interact with the caller ID service 220.

The caller ID service 220 may be adapted to receive as input and/or otherwise obtain from default storage, such as for example the backend resource(s) 206 and/or the like, a caller profile corresponding to a telephone number detected by the caller ID service 220, e.g., in a notification object passed by a notification listener service registered for an application program such as the app(s) 215.

The caller ID service 220 may be adapted to create and register the notification listener service for a respective one of the app(s) 215, e.g., in an Android manifest file. The caller ID service 220 may be further adapted to implement and register for the app 215 a broadcast receiver. The caller ID service 220 may be further yet adapted to obtain user permissions for the app 215 to access notifications presented on the apparatus 200, e.g. by the operating system platform 205 of the mobile device 201, and/or to access phone state by the broadcast receiver registered.

The caller ID service 220 may be adapted to receive from the broadcast receiver registered for the app 215 an indication of a phone call generated, and optionally other related information, e.g., phone state. The caller ID service 220 may be further adapted to obtain a notification object of a notification intercepted by the notification listener service registered for the app 215, such as Android status bar notification presented by an Android dialer app upon the phone call being generated.

The caller ID service 220 may be adapted to analyze contents of fields of the notification object received from the listener in order to determine whether the notification issuer app is the dialer app, detect a telephone number according to one or more field patterns, obtain other phone call-related information, and/or the like.

The caller ID service 220 may be adapted to retrieve a caller profile for the phone number detected and upon an incoming call from that number, present identification information from the caller profile to a user of apparatus 200, e.g., via the I/O interface 210 and/or other likewise outputs, such as over the network 202 to one or more of external device(s) connected.

The caller ID service 220 may retrieve the caller profile either from the storage 214 and/or from the database 208 of the backend service(s) 206 where a larger number of caller profiles may be retained. In some embodiments, the caller ID service 220 may send the telephone number detected in the notification object's field value to the backend service(s) 206, optionally along with other information related to the phone call as obtained from the broadcast receiver and/or analysis of field contents of the notification object, in order to receive the caller profile in return, and/or for recordation of the information at the database 208, optionally subject to additional processing at the backend service(s) 206.

Optionally, the caller ID service 220 may be utilized by one or more other services and/or functionalities relying on caller identification capabilities, such as for example, spam blocking services and/or the like.

Figure 3A:
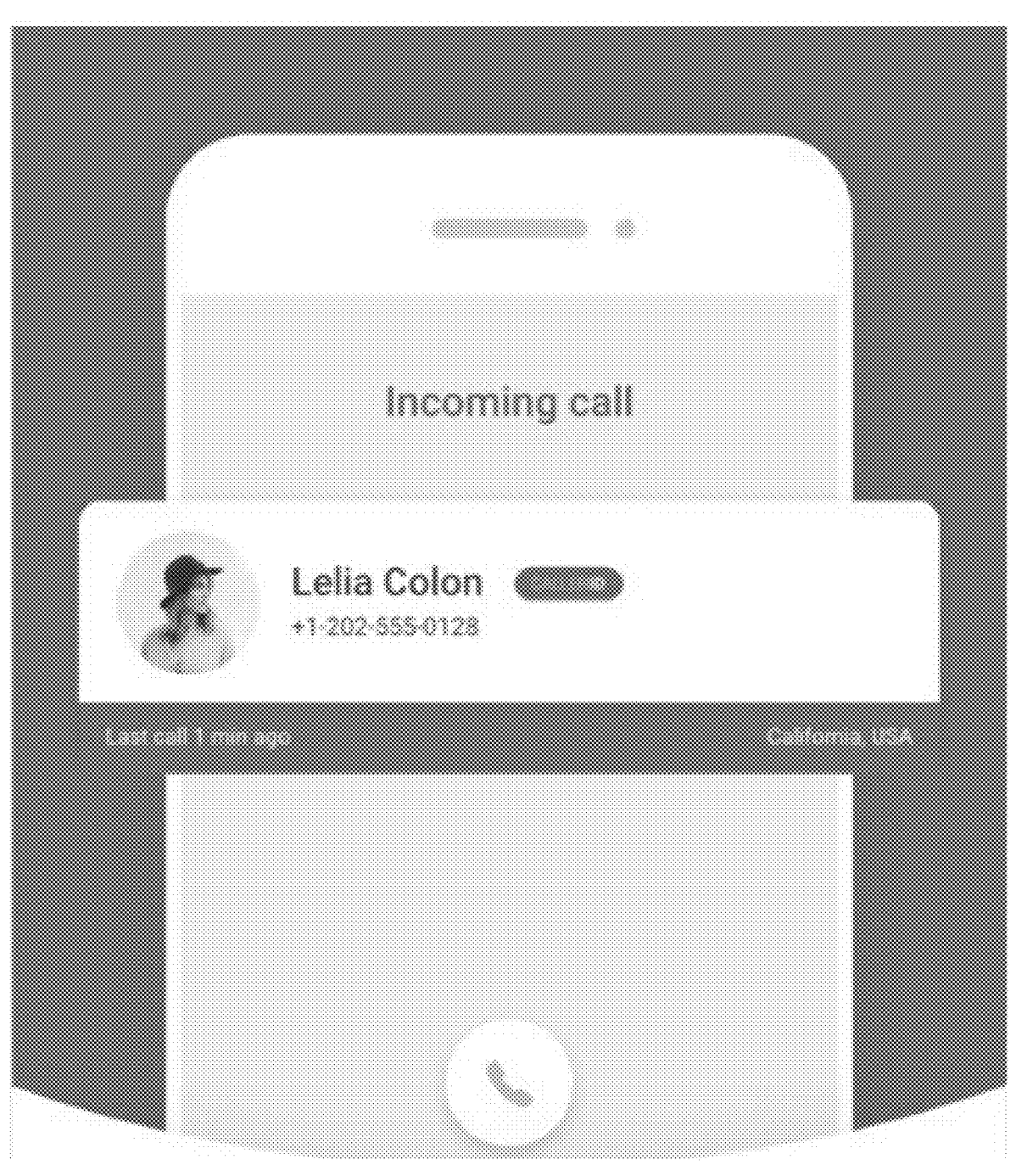
FIG. 3A is a schematic illustration of an exemplary display on a mobile device of caller identification information use for presenting profile details, according to some embodiments.

Reference is now made to FIG. 3A which is a schematic illustration of an exemplary display on a mobile device of caller identification information use for presenting profile details, according to some embodiments.

Figure 3B:
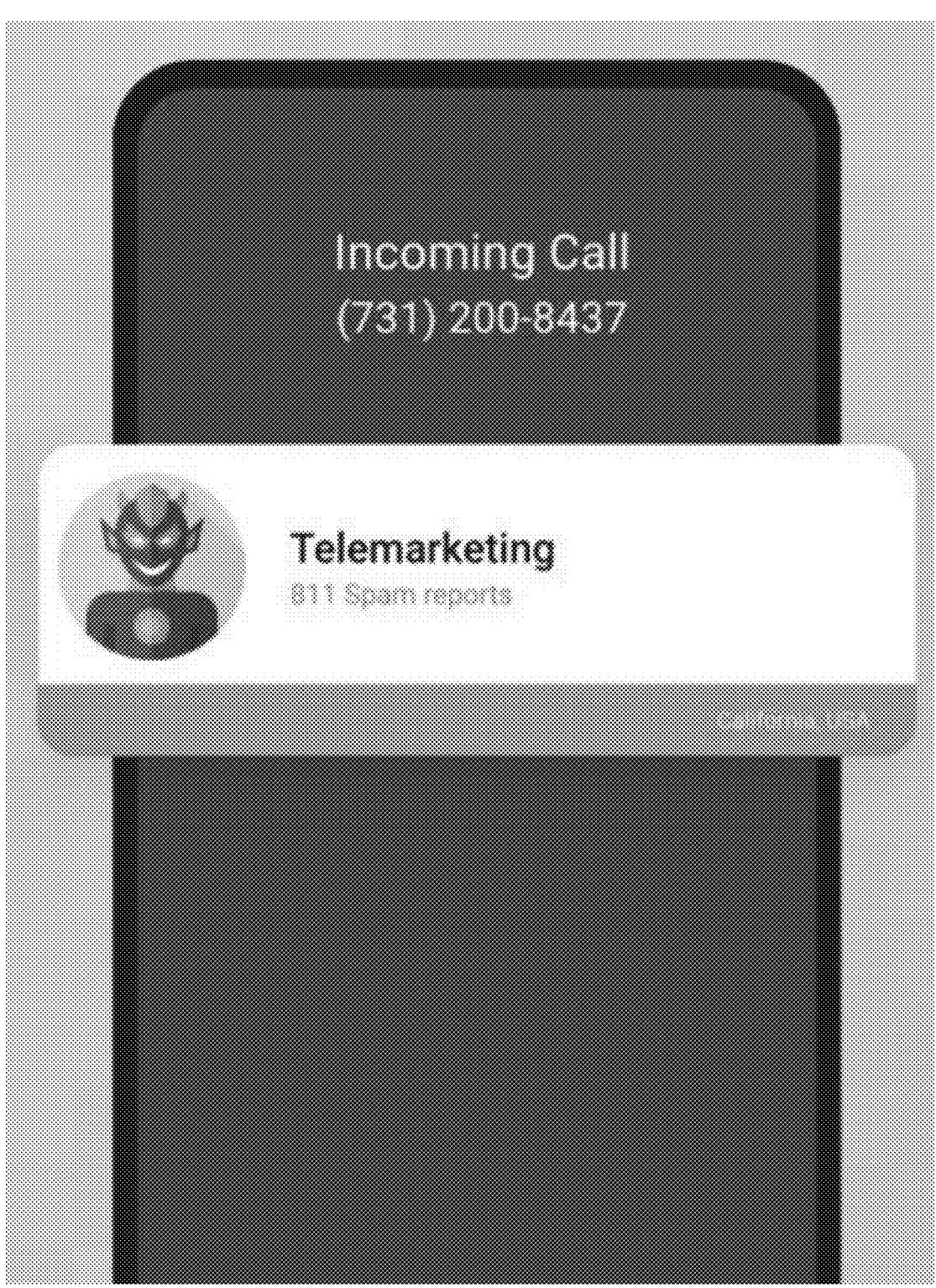
FIG. 3B is a schematic illustration of an exemplary display on a mobile device of caller identification information use for spam blocking, according to some embodiments.

Reference is also made to FIG. 3B which is a schematic illustration of an exemplary display on a mobile device of caller identification information use for spam blocking, according to some embodiments.

As shown on FIG. 3A, upon receipt of an incoming call at a mobile device, a phone number from which the incoming call originates, wherever available, may be queried by a caller identification service for a caller profile associated with the number in question. In case that a matching caller profile is found, the. n identification information from the caller profile, such as for example, a name, an image, a time elapsed from last call, and/or the like, may be presented on the device to a user, e.g., displayed on screen, optionally in addition to the phone number, so that the user may quickly ascertain the caller's identity and decide if to accept the call or not.

Additionally or alternatively, and as shown on FIG. 3B, there may be taken one or more of specified actions with relation to incoming call(s) from a particular caller or caller type, for example, a caller identification service may be utilized and/or invoked by a spam blocking service that may identify unwanted calls such as telemarketing and/or the like and automatically reject such calls, optionally alongside notifying the user about the call and action taken with regard thereto.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant mobile devices and platforms will be developed and the scope of the term "mobile device" will be developed and the scope of the term "mobile device" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for providing an application program with caller identification functionality, comprising:
   providing program instructions which, when executed by at least one processor, cause the at least one processor performing:
      obtaining at least one notification object corresponding to at least one notification message graphical user interface element presented externally to a graphical user interface of the application program and intercepted by a listener service registered for the application program;
      for a respective one of the at least one notification object:
         analyzing content of at least one field of the respective notification object according to at least one field pattern;
         obtaining call information comprising at least a telephone number extracted from the content analyzed;
         retrieving a profile corresponding to the telephone number from a database; and
         in response to an incoming call from the telephone number, presenting a user of the application program with identification information from the profile.

2. The method of claim 1, further comprising providing program instructions for prompting the user to approve notifications access by the application program, subsequent to registering the listener service.

3. The method of claim 1, wherein the obtaining of call information further comprising determining a call state of a telephone call associated with the respective notification object using a call state manager broadcast receiver registered for the application program.

4. The method of claim 3, further comprising providing program instructions for prompting the user to approve access to read phone state by the application program, subsequent to registering the call state manager broadcast receiver.

5. The method of claim 3, wherein determining the call state further comprising checking for the respective notification object a value of a field indicative of the telephone call taking place.

6. The method of claim 5, wherein the value denotes a predicate of a chronometer display.

7. The method of claim 1, wherein the at least one field pattern comprising a first pattern for an address book contact and a second pattern for a non-address book contact.

8. The method of claim 1, wherein analyzing the content of the at least one field further comprising determining whether the respective notification object corresponds to a notification shown by a dialer application program, by using a package name and a respective package field of the respective notification object.

9. The method of claim 1, wherein the program instructions are provided via a software development kit.

10. The method of claim 1, wherein retrieving the profile comprising sending the telephone number to a backend server.

11. A computer program product comprising:
   a non-transitory computer readable storage medium;
   program instructions for executing, by a processor, a method for providing an application program with caller identification functionality, comprising:
      program instructions for obtaining at least one notification object corresponding to at least one notification message graphical user interface element presented externally to a graphical user interface of the application program and intercepted by a listener service registered for the application program;
      program instructions for performing, for a respective one of the at least one notification object:
         analyzing content of at least one field of the respective notification object according to at least one field pattern;
         obtaining call information comprising at least a telephone number extracted from the content analyzed;
         retrieving a profile corresponding to the telephone number from a database; and
         in response to an incoming call from the telephone number, presenting a user of the application program with identification information from the profile.

12. The computer program product of claim 11, further comprising program instructions for prompting the user to approve notifications access by the application program, subsequent to registering the listener service.

13. The computer program product of claim 11, wherein the obtaining of call information further comprising determining a call state of a telephone call associated with the respective notification object using a call state manager broadcast receiver registered for the application program.

14. The computer program product of claim 13, further comprising program instructions for prompting the user to approve access to read phone state by the application program, subsequent to registering the call state manager broadcast receiver.

15. The computer program product of claim 13, wherein determining the call state further comprising checking for the respective notification object a value of a field indicative of the telephone call taking place.

16. The computer program product of claim 11, wherein the at least one field pattern comprising a first pattern for an address book contact and a second pattern for a non-address book contact.

17. The computer program product of claim 11, wherein analyzing the content of the at least one field further comprising determining whether the respective notification object corresponds to a notification shown by a dialer application program, by using a package name and a respective package field of the respective notification object.

18. The computer program product of claim 11, wherein the program instructions are provided via a software development kit.

19. The computer program product of claim 11, wherein retrieving the profile comprising sending the telephone number to a backend server.

20. An apparatus for providing an application program with caller identification functionality, comprising:

a processing circuitry adapted for:

obtaining at least one notification object corresponding to at least one notification message graphical user interface element presented externally to a graphical user interface of the application program and intercepted by a listener service registered for the application program;

for a respective one of the at least one notification object:

analyzing content of at least one field of the respective notification object according to at least one field pattern;

obtaining call information comprising at least a telephone number extracted from the content analyzed;

retrieving a profile corresponding to the telephone number from a database; and in response to an incoming call from the telephone number, presenting a user of the application program with identification information from the profile.

\*   \*   \*   \*   \*